United States Patent [19]

Davies, III

[11] 4,352,588

[45] Oct. 5, 1982

[54] WOOD JOINT

[76] Inventor: Benjamin Davies, III, 518 Sterling Ave., Chattanooga, Tenn. 37405

[21] Appl. No.: 176,010

[22] Filed: Aug. 7, 1980

[51] Int. Cl.³ ............................................. B25G 3/08
[52] U.S. Cl. .................................. 403/382; 144/82; 144/144 R; 144/347; 144/371
[58] Field of Search ................. 144/87, 85, 82, 83, 144/198 R, 199, 200, 203, 204, 134 R, 134 C, 134 D, 136 R, 136 C, 90 R, 144 R, 314 B, 323, 309 L; 409/182, 184, 113; 403/231, 382, 205, 401, 403

[56] References Cited

U.S. PATENT DOCUMENTS

| | | | |
|---|---|---|---|
| 1,098,405 | 6/1914 | Reinecker | 403/382 |
| 1,533,099 | 4/1925 | Carroll | 403/231 |
| 1,569,490 | 1/1926 | Hiscock | 144/134 C |
| 1,948,383 | 2/1934 | Johnson | 403/382 |
| 3,910,327 | 10/1975 | Heckenlaible | 144/144 R |
| 4,168,730 | 9/1979 | Keller | 144/326 R |

*Primary Examiner*—W. D. Bray
*Attorney, Agent, or Firm*—Alan Ruderman

[57] ABSTRACT

A rail and stile member of a wood frame is joined at a curvilinear edge at abutting facial surfaces. In a number of embodiments the members have a tenon and mortise connection behind the curvilinear edge. In one embodiment a three piece joint is formed with curvilinear edges at each pair of abutting facial surfaces. The method of forming the joint includes the forming of a guide template having the desired configuration but displaced from the joint line and cutting of the rail and stile with a router tool of a preselected bit size.

9 Claims, 7 Drawing Figures

U.S. Patent   Oct. 5, 1982   4,352,588
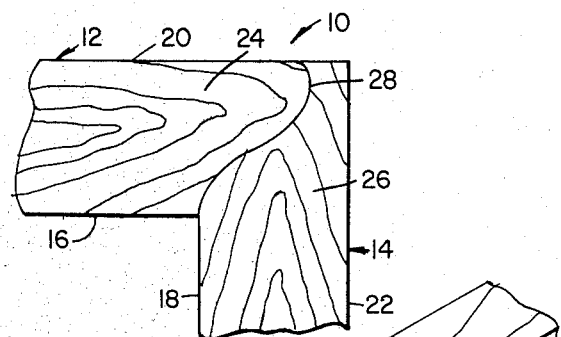
FIG. 1
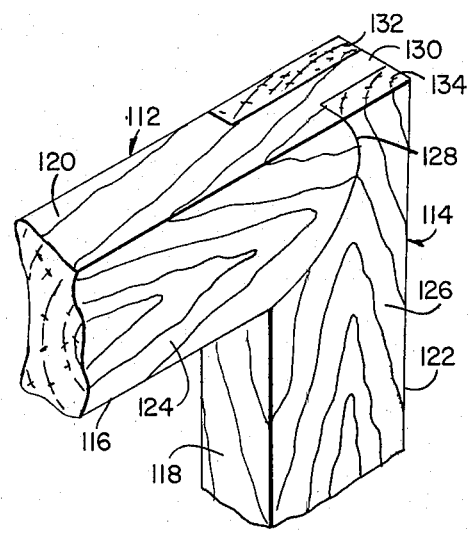
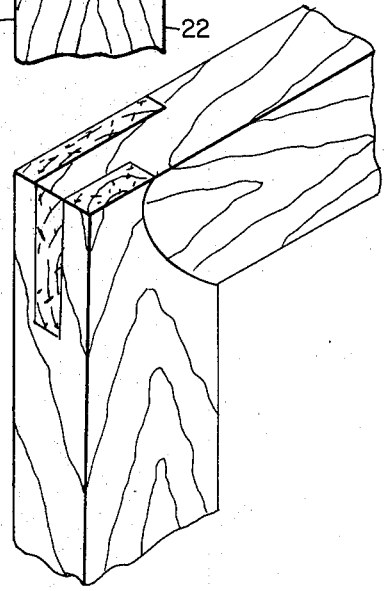
FIG. 2
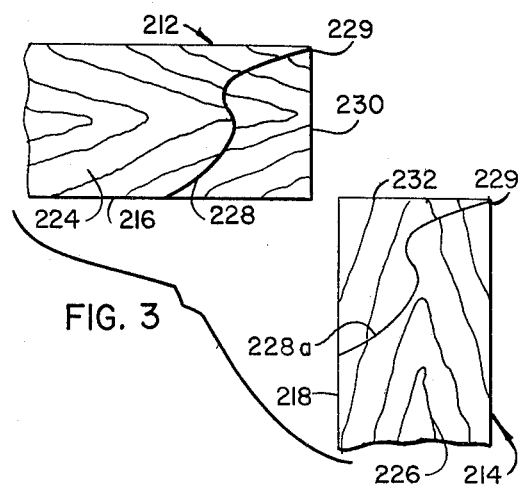
FIG. 3
FIG. 5
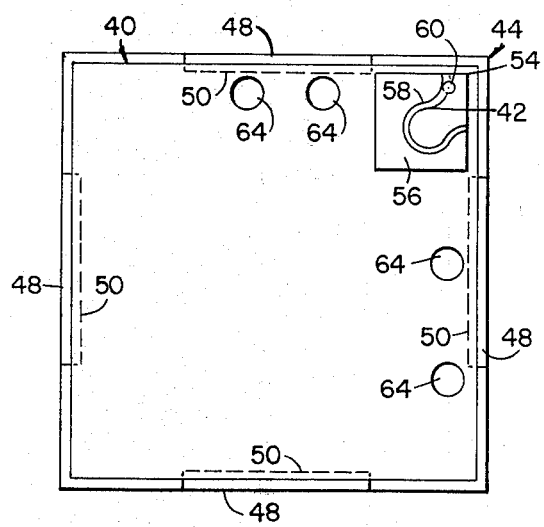
FIG. 4
FIG. 7
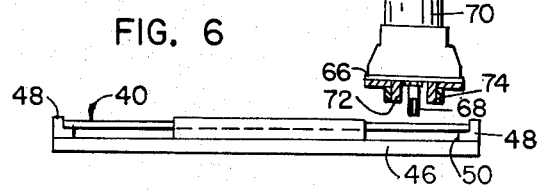
FIG. 6

WOOD JOINT

BACKGROUND OF THE INVENTION

This invention relates to wooden corner joints and more particularly to curved joints of this type and to a method and apparatus for cutting both sides of the joint with a power router guided along a single template.

In the construction of wood frames for such applications as doors, picture frames, cabinetry, etc. the rail and stile members may be butted together or joined at a miter joint to form the corner of the frame. The miter joint is the generally preferred joint in many applications because it is more aesthetically appealing since it avoids viewing of the end grain. In either instance the joint may be further strengthened by a mortise and tenon construction, or a half lap or other strengthening arrangement, but the visual connection of the abutting facial surfaces remains substantially a straight line. From the aspect of an aesthetic or visual appeal these known corner joints are limiting and in instances where used on frames forming a portion of, or used in conjunction with, cabinetry having an artistic flare, they in many instances appear misplaced.

SUMMARY OF THE INVENTION

One aspect of the present invention provides a corner joint between frame members wherein the visual connection between abutting facial surfaces of the members is curvilinear. The exact configuration of the curvilinear connection can be varied to provide a joint adaptable to an overall spatial arrangement of surfaces, lines and grain patterns.

A feature of the invention is a three or more member corner having a curvilinear joint between each pair of abutting members, thereby providing an aesthitic appearance not heretofore known.

A further feature of the invention is the formation of a curved corner joint at abutting facial surfaces and having a slot mortise and tenon connection or other joint strenthening connection at the remaining abutting surfaces.

Another important feature of the invention is a method of manufacturing a curvilinear corner joint in frame members by cutting both the abutting facial surfaces with a router guided along a single template, and the method of making the template.

Consequently, it is a primary object of the present invention to provide an aesthetically attractive joint between the rail and stile members of a wood frame structure.

It is another object of the present invention to provide a corner joint for a wood frame comprising rail and stile members joined together along a curvilinear line at abutting facial surfaces.

It is a further object of the present invention to provide a method of cutting a curved corner joint for connecting the abutting facial surfaces of a rail and a stile, the cutting being performed by a router making its cuts along the same joint line on both the rail and stile and approaching the line from different sides in each of the joining members.

In practicing the principles of the invention a curvilinear joint at abutting facial surfaces of the connecting rail and stile members can be manufactured having substantially unlimited arcuate configurations, the rail and stile each being cut along the same joint line and therefor abutting with precision at the joint line. In practicing the method of the invention a template is produced having a guide surface of the desired shape but parallel to and displaced from the joint line by a distance substantially equal to the radius of the router cutter bit that will be used to cut the joint plus the radius of a first guide collar to be used to follow the template. The template is then mounted in a fixture having jig members for supporting the template above the individually cut rail and stile members which are positioned against the appropriate jig members. A cut is then made on either the rail or stile using the first guide collar. The other of the rail or stile members is then inserted in the fixture against the appropriate jig member and is cut using a second guide collar having a radius equal to that of the first guide collar plus the diameter of the router cutting bit so that the second cut is along the same line but approached from the opposite side of the joint.

BRIEF DESCRIPTION OF THE DRAWINGS

The particular features and advantages of the invention as well as other objects will become apparent from the following description taken in connection with the accompanying drawings, in which:

FIG. 1 is an elevational view illustrating a portion of a frame having a curved joint at abutting facial surfaces of the rail and stile members forming a corner thereof;

FIG. 2 is a fragmentary perspective view of a frame having another curved joint and a mortise and tenon connection at a corner;

FIG. 3 is an elevational view prior to assembly of a third joint and having the curvilinear abutting surfaces extending in miter fashion to the exterior corner of rail and stile members and having a mortise and tenon connection;

FIG. 4 is an elevational view similar to FIG. 1 but of a three piece corner joint having curvilinear joints at each abutting facial surface;

FIG. 5 is a top plan view of a fixture with a template mounted thereon used in the production of a right angle corner joint;

FIG. 6 is a side elevational view of the fixture of FIG. 5 and illustrating a router disposed over the template prior to cutting; and FIG. 7 is a schematic representation illustrating the principles of cutting the joint along the same line in each of the joining members.

DESCRIPTION OF THE PREFERRED EMBODIMENTS

Referring now to the drawings FIG. 1 illustrates a corner portion of a frame 10 which comprises a rail member 12 joined to a stile member 14. The corner portion illustrated is the upper right hand corner of the frame and each of the members 12 and 14 are elongated in the direction away from the corner, the side edge margin 16 of the rail and 18 of the stile defining the inner edge surfaces of the frame while the side edge margins 20 of the rail and 22 of the stile define the outer edge surface of the frame. The visible facial surfaces 24 and 26 of the rail and stile respectively are coextensive one to the other at the junction of the members and abut with each other along a curvilinear edge 28. The particular arcuate configuration of the curvilinear edge is immaterial since by the method hereinafter disclosed the edge can be made to any suitable configuration.

The joining edge 28 of the abutting facial surfaces 24 and 26 may be continuous through the rail and stile to be a full butt joint. However, as illustrated in FIG. 2 a curved mortise and tenon joint may be more desirable for added structural integrity of the joint. In FIG. 2 the rail 112 has a tenon 130 formed intermediate the facial surfaces while the stile 114 is slotted intermediate a pair of spaced wings 132 and 134 for receiving the tenon. The facial surface 124 of the rail and the facial surface 126 of the stile are coextensive and abut at the curvilinear edge 128 which has been illustrated as having a different configuration than that shown in FIG. 1. In this case the mortise and half of the tenon are formed prior to the formation of the curved joint. The mortise of the stile is completed in the conventional manner by forming the slot intermediate the wings 132 and 134, however the tenon is completed only on the rear side for receipt of the wing 132 while the side having the facial surface 124 is left unfinished until the curved joint is formed.

In FIG. 3 a third form of the curvilinear joint is illustrated where the curved edges 228 and 228a on each of the rail and stile 212 and 214 respectively extend from the inner surfaces 216,218 to the exterior corner 229 formed at the intersection of the outer surfaces 212 and 214. In other respects the joint illustrated in FIG. 3 is similar to that of FIG. 2 having a tenon 230 formed in the rail and a mortise defined intermediate the wing 232 and a wing comprising the facial surface 226.

The three piece joint illustrated in FIG. 4 is similar to the two piece joints but includes a third member 300 interposed intermediate the rail 312 and the stile 314, thereby forming a combination joint having curvilinear edges 328 and 328a at adjoining facial surfaces of the rail 312 and member 300 and the stile 314 and member 300. One of the joints 328,328a is first produced by the method hereafter described and the member 300 is thereafter secured as by gluing to the appropriate member 312,314, the combined piece then is utilized with the other of the rail or stile members to form the remainder of the joint again by the method hereinafter described.

To produce a joint having a curvilinear edge a template generally indicated at 40 is produced having a guide edge 42 and positioned upon a fixture 44. The fixture 44 includes a base 46 on which elongated jigs 48 are secured. The jigs have a substantially L-shaped cross sectional configuration, the notched portion facing the interior of the fixture for supporting the template 40. For a right angled corner joint, although only two jigs may be required, four jigs are preferred for the various combinations of arrangements, the jigs being preferably spaced along the sides and disposed 90° apart for aligning the rails and stiles with the template held thereon. For joints of different angular disposition, the angular relationship between the jigs is adjusted accordingly. To insure a proper disposition, the template may first be made and temporarily attached to the jigs and then positioned and secured on the base. The rail or stile to be cut is positioned against the inner edge 50 of the jig and positioned in the desired corner with the template in place. The curvilinear edge is thereafter cut with a router 52 as further described hereinafter.

The template 40 conveniently may be constructed of plywood of a thickness capable of supporting the router without sagging but not so thick as to prevent the making of a deep cut by the router. A desired edge configuration 58 may be layed out directly on the template making corner measurements from the edges 50 of the jigs such that the outer corner of the frame, e.g. corner 229 in FIG. 3 lies at the intersection 54 of these edges as illustrated in FIG. 5. However, it is a simpler and more accurate procedure to first make a master template of a piece of plywood or plastic and to lay out a curve exactly as it would be on the finished frame in a corner thereof corresponding to the corner of the frame. For a right angle frame the master template 56 has a right angle corner and the curve 58 which will be the exact size and configuration of the abutting edge of the rail and stile members such as edge 28 in FIG. 1 is layed out and cut smoothly.

The master template 56 is thereafter positioned on the template 40 as illustrated in FIG. 5 with the corner of the master template at the point 54. Since a router guide will be used to follow the desired curve and because the outer edge of the router bit is offset from the outer edge of the guide and cuts from opposite sides of the joint line, the curve 42 transposed onto the guide template 40 must be offset from the actual curve 58 as formed on the master template 56. The distance which the curve 58 must be transposed is equal to the diameter of the router cutter bit plus the distance from the periphery of the bit to the outside perphery of the template guide. This distance is therefor equal to twice the radius of the cutter plus an amount equal to the radius of the guide minus the radius of the cutter. In mathematical terms if $r_c$=the radius of the router cutting bit and $r_1$ is the radius of one of the guides, then the distance that the template guide edge 42 is displaced from the line of cut 58 is equal to $2r_c+(r_1-r_c)=r_c+r_1$.

A pretty fair approximation of the curve 42 can be made by measuring off a few appropriately spaced points perpendicular to tangents of the curve 58 laid out directly on the main template and thereafter sketch in the curve 42. However, a more accurate procedure is to use a marking gauge 60 having a radius equal to the distance between the curves 58 and 42. A thin rigid piece of plastic can be formed with a radius of $r_c+r_1$ and with a small hole made at the axis or geometric center to accomodate the point of a pencil or scribe. The perimeter of the gauge 60 may then be rolled against the master template curve 58 to describe the line 42 onto the main template 40. The line 42 is thereafter cut and sanded and provides the guide surface followed by the router guides. A number of holes 64 may be bored in the template 40 so that the rails and stiles may be clamped in place in position against the jig members 48.

The router 52 includes a circular base member 66 through the center of wich the router cutter bit 68 axially depends, the bit 68 being conventionally driven by a motor within the router housing 70. Various size guide collars 72 are generally supplied and are abundantly available through router manufacturers. The guide 72 in the present instance has a radius $r_1$ which was used in the calculation of the distance of transposition of the curve 58 to the curve 42 above described. This guide is used in conjunction with the router cutting bit 68 having a radius $r_c$ to cut one of the rail or stile members. However, the other of the rail or stile members must be cut using a guide 74 of a larger diameter to make a cut on the other member along the same cutting line but approached from the opposite side of the cutter. For example, as illustrated schematically in FIG. 7, the guide member 72 follows the template surface 142 while the cutter 68 cuts a path shown by the line 158. The line 158 depicts the curvilinear edge of the rail and stile members. Thus, since this edge must be cut from opposite sides thereof in each of the rail and stile members, and the guide 72 allows the cutting bit 68 to cut a path touching the line 158 and extending toward the template edge 142 by an amount substantially equal to the diameter of the cutting bit, the second guide 74 must allow the cutter to cut a path also touching the line 158 but disposed on the opposite side thereof from the edge 142.

Since the distance between the line 158 and the edge 142 is equal to radius $r_1$ of the guide member 72 plus the radius of the cutting bit 68 and is also equal to the radius $r_2$ of the guide member 74 minus the radius $r_c$ of the cutter 68, by equating these two relationships and solving simultaneously the radius $r_2$ of the guide member 74 is equal to the radius of the guide member 72 plus the diameter of the cutter or $r_2$ equals $r_1$ plus $2 r_c$. The guide member 74 is thereby formed with this value as the radius of its circumference by turning an annular metallic member on a metal lathe. Preferably the inside diameter is made substantially the same as the outside diameter of the guide collar 72 so that it may be pressed thereon as illustrated in FIG. 6, and may thus be easily attached and removed as necessary. The other of the rail and stile members is thereafter cut using the router guided by the collar 74 to form the mating edge of the first cut member. The rail and stile now have complementary edges which can be easily secured together. The template 40 may thereafter be flipped over on the base 46 to make the opposite joint of a frame symetrically.

To make a curved mortise and tenon joint the mortise is initially completed and half of the tenon is completed as stated above. The rail or stile is then clamped into place under the template and the small guide collar 72 is attached to the router. The bit is thereafter lowered so that it projects only through the top wing of the mortise and the cut is made following the curve 42 of the template 40 with the guide collar 72. The member so made is removed and the other of the rail and stile members is placed under the template at 90° to where the previously made part was disposed, and the large guide collar 74 is attached to the router. The cutter bit is thereafter used to cut away the shoulder of the tenon without changing the depth of the router cut. The template can now be rotated or flipped as necessary to the other corners if those are going to have the same curvature. It is immaterial whether the tenon is in the stile or in the rail or which one is cut by either of the guide collars since both cuts define the same line and it is only necessary that the line be approached from different sides in the same joint.

Numerous alterations of the structure herein disclosed will suggest themselves to those skilled in the art. However, it is to be understood that the present disclosure relates to the preferred embodiments of the invention which is for purposes of illustration only and not to be construed as a limitation of the invention. All such modifications which do not depart from the spirit of the invention are intended to be included within the scope of the appended claims.

Having thus described the nature of the invention, what is claimed herein is:

1. A joint at one end of a rail and a stile angularly joined together to form a corner of a wooden frame, said rail and stile each comprising a substantially elongated body having a pair of facial surfaces spaced apart by side edge margins forming inner and outer edge surfaces of the frame, the facial surfaces of said rail being coextensive with a respective facial surface of said stile at the joint, the wood grain structure of each of said rail and stile lying in the respective facial surface and extending generally transverse to said joint, and at least one of the facial surfaces of said rail abutting the corresponding facial surface of said stile at a curvilinear edge.

2. A joint as recited in claim 1, wherein one of said rail and stile includes an integral wing defining a tenon intermediate the facial surfaces thereof and extending beyond said curvilinear edge and the other of said rail and stile includes a slot defining a mortise intermediate the facial surfaces for receiving said tenon.

3. A joint as recited in claim 2, wherein the extremity of said tenon extends beyond said curvilinear edge and is coextensive with the outer edge surface of the other of said rail and stile.

4. A joint as recited in claim 1, wherein said curvilinear edge extends from said inner to said outer surface.

5. A joint as recited in claim 1, wherein one of said rail and stile comprises first and second members joined together at a curvilinear edge, one of said first and second members being joined to the other of said rail and stile at the first mentioned curvilinear edge.

6. A method of forming a joint between a rail and a stile of a frame structure such that facial surfaces of the rail and stile are coextensive and abut at an edge having a curvilinear configuration, said method comprising cutting said edge in each of said rail and stile with a router tool having a rotatable cutting bit of a radius $r_c$, the cutting of one of said rail and stile being performed while guiding said router tool along a guide template by following said guide template with a first annular guide member having a guide surface of a radius $r_1$ concentric about said cutting bit and the cutting of the other of said rail and stile being performed while guiding said router tool along said guide template by following said guide template with a second annular guide member having a guide surface of a radius substantially equal to $r_1 + 2r_c$ concentric about said guide surface, said method including the step of forming said guide template with the same configuration as said curvilinear edge but displaced from said edge by a distance substantially equal to the sum of the radius of the cutting bit ($r_c$) plus the radius of the first annular guide member ($r_1$).

7. The method as recited in claim 6, wherein said step of forming said template comprises forming a master template having the exact configuration as said curvilinear edge, positioning said master template on said guide template, forming a circular marking gauge having a radius equal to $r_c + r_1$, and moving said marking gauge along said master template while inserting a scribing implement through the geometric center of said marking gauge to scribe a guide line, and thereafter cutting said guide template along the guide line and removing guide template material from the guide line toward the master template.

8. The method as recited in claim 6, wherein the cutting of said edges comprises inserting said template in a fixture having a plurality of jigs each including a planar template supporting surface, said jigs having lateral guide edges angularly disposed one to the other at the same angular disposition as said rail and stile, said guide edges being below said template and disposed substantially normal thereto, and inserting and clamping one of said rail and stile in said fixture in abutting engagement with a first jig, cutting said one of said rail and stile, and thereafter inserting, clamping and cutting the other of said rail and stile while in abutting engagement with the guide edge of another jig.

9. The method as recited in claim 6, wherein a slot mortise is cut in one of said stile and rail prior to cutting said edge, said slot mortise being intermediate facial surfaces of said one of said stile and rail, and half of a cooperating tenon is cut in the other of said stile and rail prior to cutting said curvilinear edge in each of said stile and rail.

* * * * *